United States Patent [19]
Rohling et al.

[11] Patent Number: 5,289,192
[45] Date of Patent: Feb. 22, 1994

[54] SIGNAL PROCESSING METHOD FOR A RADAR SYSTEM

[75] Inventors: Hermann Rohling, Wolfenbüttel; Wilfried Plagge, Ohrum; Manfred Minker, Ulm, all of Fed. Rep. of Germany

[73] Assignee: Telefunken Systemtechnik AG, Ulm, Fed. Rep. of Germany

[21] Appl. No.: 925,055

[22] Filed: Aug. 5, 1992

[30] Foreign Application Priority Data

Sep. 27, 1991 [DE] Fed. Rep. of Germany ....... 4132240

[51] Int. Cl.$^5$ .................... G01S 13/28; G01S 13/50
[52] U.S. Cl. .................................. 342/201; 342/109
[58] Field of Search .................. 342/109, 195, 201

[56] References Cited
U.S. PATENT DOCUMENTS

| | | | |
|---|---|---|---|
| 4,521,779 | 6/1985 | Lewis | 342/201 X |
| 4,566,011 | 1/1986 | Lewis et al. | 342/201 |
| 4,578,677 | 3/1986 | Lewis | 342/201 |
| 4,698,827 | 10/1987 | Kretschmer | 342/201 X |
| 4,734,699 | 3/1988 | Kretschmer, Jr. | 342/201 |
| 5,119,100 | 6/1992 | Marini et al. | 342/195 |
| 5,192,956 | 3/1993 | Lee | 342/201 X |

*Primary Examiner*—T. H. Tubbesing
*Attorney, Agent, or Firm*—Spencer, Frank & Schneider

[57] ABSTRACT

The present invention relates to a signal processing method for a radar system. The transmitted signal here includes a polyphase code that is optimized to the desired range/Doppler range and that is repeated periodically over time.

2 Claims, 5 Drawing Sheets

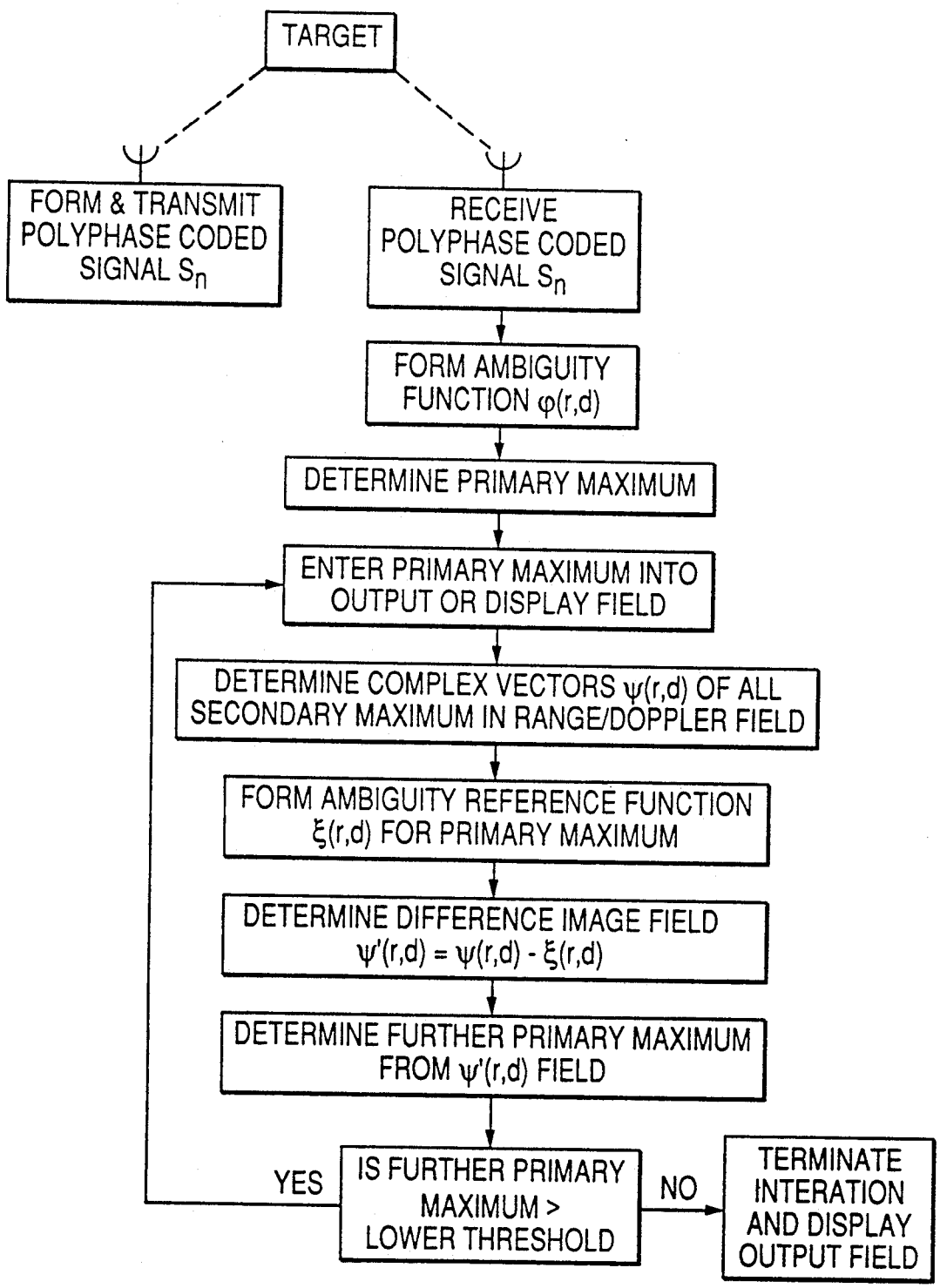

SIGNAL PROCESSING METHOD FOR A RADAR SYSTEM

CROSS REFERENCE TO RELATED APPLICATIONS he present application claims the rights of priority with respect to application Ser. No. P 41 32 240.1 filed Sep. 27, 1991, in Germany, the subject matter of which is incorporated herein by reference.

BACKGROUND OF THE INVENTION

The present invention relates to a method for processing signals in a radar system in which coded signals are transmitted, then received and thereafter evaluated.

In radar systems, semiconductor transmitters and/or active array antennas are employed to an ever increasing degree. These components reduce the high peak power of short transmitted pulses from that which usually occurs in tube instruments. With a lower peak power, a high-duty-cycle operation or a CW operation with intrapulse modulation and the use of a pulse compression method are necessary to ensure the possibility of measuring distances. In such methods, periodic codes are employed to code the transmitted signals, and the associated received signals are evaluated with the aid of cross correlation functions.

It has now been found that, particularly in the evaluation of one or several moving, actually existing targets, seemingly existing targets are created in a disadvantageous manner. The latter are annoying and are produced because of the code and/or correlation function employed.

SUMMARY OF THE INVENTION

It is an object of the present invention to provide a method of the above described type in which, with a simultaneous measurement of the target distance and the radial velocity of the target, particularly in multi-target situations, there is a wide unambiguousness range in the distance domain as well as in the velocity domain.

The above and other objects are accomplished in accordance with the invention by the provision of a method for processing signals in a radar system in which coded signals are transmitted, then received and thereafter evaluated, including the steps of coding the transmitted signal with a polyphase code that is repeated periodically over time and is adapted to a maximum distance unambiguous range ($R_{max}$) and a maximum Doppler frequency unambiguous range ($f_{Dmax}$) of the radar system, with the polyphase code being formed according to the following equation:

$$s_n = \exp\left[j\frac{\pi}{3 \cdot N}(n^3 - N^2 n)\right]$$

where
$s_n$ = original signal
n = 0, ..., N−1
N = number of sub-pulses included in the polyphase code and
$N \geq 3$; N = prime number;
and where the following equations are applicable:

$$R_{max} = N \cdot \tau \cdot c / 2$$

and $$f_{Dmax} = 1/\tau$$

where
$\tau$ = length of a sub-pulse; and
c = speed of light.

One advantage of the invention is that, in a surprising manner, the maximum distance unambiguous range $R_{max}$ and the maximum Doppler f frequency unambiguous range $f_{Dmax}$ can be set independently of one another over a wide range and can thus be adapted to the use of the radar system.

The present invention is based on the realization that the use of special periodic codes and an evaluation method adapted thereto results in an evaluation function in which, in a single-target situation, only one primary maximum having associated secondary maxima is created, with the latter all essentially having the same height.

The invention will now be described in greater detail with reference to embodiments thereof which are illustrated in schematic drawings.

BRIEF DESCRIPTION OF THE DRAWINGS

FIG. 5 is a flow diagram of the method according to the invention.

DESCRIPTION OF PREFERRED EMBODIMENTS

In the present invention, the antenna of the radar system emits a transmitting signal which includes a polyphase code that is periodically repeated over time and is formed according to the following formula:

$$s_n = \exp\left[j\frac{\pi}{3 \cdot N}(n^3 - N^2 n)\right]$$

where
n = 0, ..., N−1
$N \geq 3$; N = prime number.
N is additionally equal to the number of sub-pulses in the polyphase code. Moreover, N equals the number of distance gates (range gates or bins) in the distance direction.

The period length over time of such a code is determined by the value $N \cdot \tau$, where $\tau$ is the sub-pulse length of a sub-pulse, that is, the code contains N sub-pulses. With such codes it is possible to realize a distance unambiguous range having a maximum distance value $R_{max}$ that is determined by the following equation:

$$R_{max} = N \cdot \tau \cdot c / 2$$

where c is the speed of light in the selected propagation medium, e.g., air. The associated maximum Doppler frequency unambiguous range, and thus the velocity unambiguous range of the target, is advantageously independent of the code word length and is a function only of the sub-pulse length $\tau$, according to the following equation:

$$f_{Dmax} = 1/\tau$$

where $f_{Dmax}$ is the maximum Doppler frequency.

Such codes have the advantageous characteristic that, in a single-target situation, during the ambiguity function, which will be described in greater detail below, only secondary maxima that all have the same value are created in addition to the primary maximum, namely:

$$\frac{\text{(value of the primary maximum)}}{\sqrt{N}} = \text{value of a secondary maximum}$$

Figure 1:
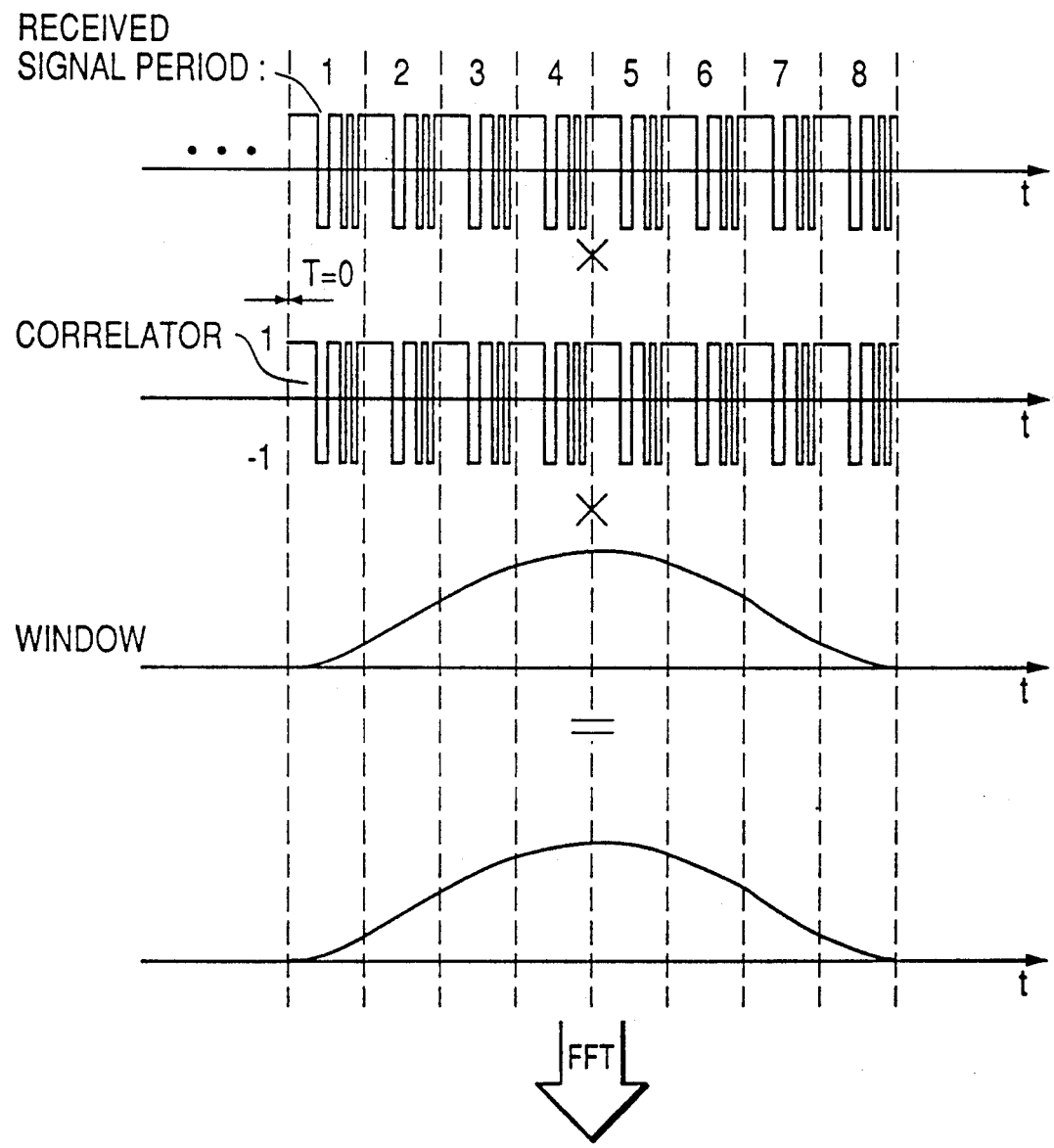
FIGS. 1 to 4 are signal diagrams used to explain the invention.

If a transmitted signal coded in this way is reflected at a moving target, a received signal, here a binary phase coded received signal, results that is periodic over time t and is shown as an example in FIG. 1. This signal is evaluated over several periods M. During this evaluation, the received signal is multiplied for each distance gate with the respective conjugated complex form of the transmitted signal, which is also called the matched correlator, and is then weighted (multiplied) with a window function $G_i$. This window function is advantageously a so-called Blackman window including three cosine members and extending at a minimum over three periods ($M_{min}=3$). Its center is symmetrical with respect to the value $(MN-1)/2$. Such a window technique is important since the otherwise created secondary maxima would become too large in an annoying manner in the direction of the Doppler frequency. However, if the window technique is employed, the number of periods M must not be selected so small, for example $M=1$, that the overlap of two adjacent Doppler frequency lobes would cause an annoying increase in the size of the secondary lobes in the ambiguity function.

From the signal resulting after the weighting (lowermost signal curve in FIG. 1), an FFT (Fast Fourier Transform) is formed. The FFT thus has a length of M·N and therefore results in an integration gain. The input values of the FFT are spaced in time relative to one another by the length of one sub-pulse; thus, within the unambiguousness range, the Doppler frequency can be measured in units of the reciprocal sub-pulse length.

Figure 2:
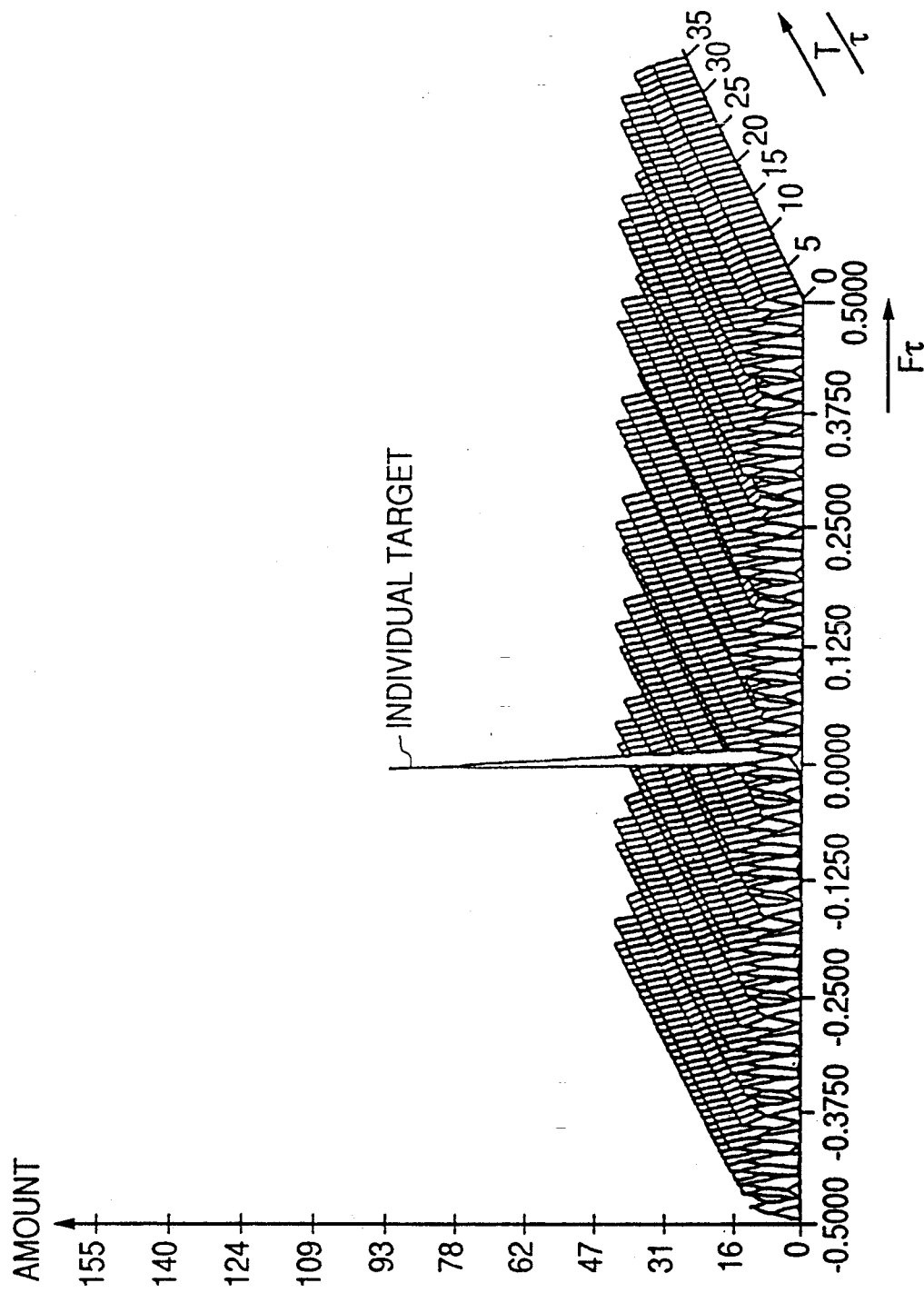

Only the amplitude of the output signal of the FFT is evaluated. FIG. 2 shows an exemplary illustration of an individual target at the Doppler frequency location $F \cdot \tau = 0$ and at the distance location $T/\tau = 1$. The value of the FFT is here plotted in arbitrary units.

The described method can be expressed by the following equation for the ambiguity function $\phi(r,d)$:

$$\phi(r,d) = \left| \sum_{n=0}^{MN-1} a_n \cdot s^*_{(n-r)mod(N)} \cdot G_n \cdot e^{-j2\pi \frac{d \cdot n}{MN}} \right|$$

where r = 0, ..., N-1; distance gate; standardized to subpulse spacing d = 0, ..., MN-1; Doppler frequency gate; standardized to $1/MN_r$ M = number of periods N = number of sub-pulses per period $s^*_i$ = matched correlator of code $s_i$ $G_i$ = window function, M periods long; center symmetrical relative to (MN-1)/2

$a_i$ = sampled values of the received signal

The spacing of the secondary lobes attainable with the mentioned polyphase code $s_n$ is given below as an example for several prime number lengths that lie in the vicinity of an integer of base 2.

| Length N | Spacing of Secondary Lobes |
| --- | --- |
| 127 | 21 db |
| 257 | 24 db |
| 509 | 27 db |
| 1031 | 30 db |
| 2053 | 33 db |
| 4099 | 36 db |
| 8191 | 39 db |
| 16381 | 42 db |
| 32771 | 45 db |
| 65537 | 48 db |

Consequently, large code lengths must be implemented during radar signal processing in order to ensure large spacing between secondary lobes. Based on the formation law involved, the generation of long codes is not difficult. However, the costs for realization are high.

The number of examined periods M must be selected as small as possible so that the available time $MN\tau$ is exhausted by the largest number of N.

The following relationship estimates the maximum attainable number of code elements:

$$N_{max} = \frac{T_B}{M_{min} \cdot \tau}$$

where $T_B$ = time of observation $\tau$ = spacing of sub-pulses $M_{min}$ = minimum number of code periods to be processed The time of observation is the time during which a target exhibits a substantially stationary reflection behavior within, for example, a rotating antenna lobe.

The signal processing method described above cannot operate without window technology since otherwise the secondary maxima in the direction of the Doppler frequency would become too large. However, when window technology is employed, the number of periods M must not be selected so small (e.g., M=1) that the overlap of two adjacent Doppler frequency lobes would cause the secondary lobes to be enlarged in the ambiguity function. For the use of a window having three cosine members (i.e. a Blackman window), $M_{min}=3$.

The following is a signal processing example:

| | |
| --- | --- |
| bandwidth of the radar system | B = 2 MHz |
| CW operation, → spacing of the sub-pulses | $\tau$ = 500 ns |
| observation time | $T_B$ = 4 ms |
| Blackman window | M = 3 |
| from which follows the code length | N ≈ 2700 |
| | e.g., N = 2731 |
| | (prime number) |
| spacing of secondary lobes | 34 db |
| distance resolution | 75 m |
| distance unambiguous range | 200 km |
| Doppler frequency resolution | 750 Hz |
| Doppler frequency unambiguous range | ±1 MHz |
| length of FFT | 8192 |
| number of FFT's | 2731 for a full distance observation 800 for a distance | of 0 ... 60 km

The number of FFT's is equal to the number of examined distance gates.

The example shown in FIG. 2 can be evaluated easily since the amplitude of the individual target is noticeably larger than that of the secondary lobes of the ambiguity function. The amplitude is independent of the intensity of the radar signal reflected at a target.

Figure 3:
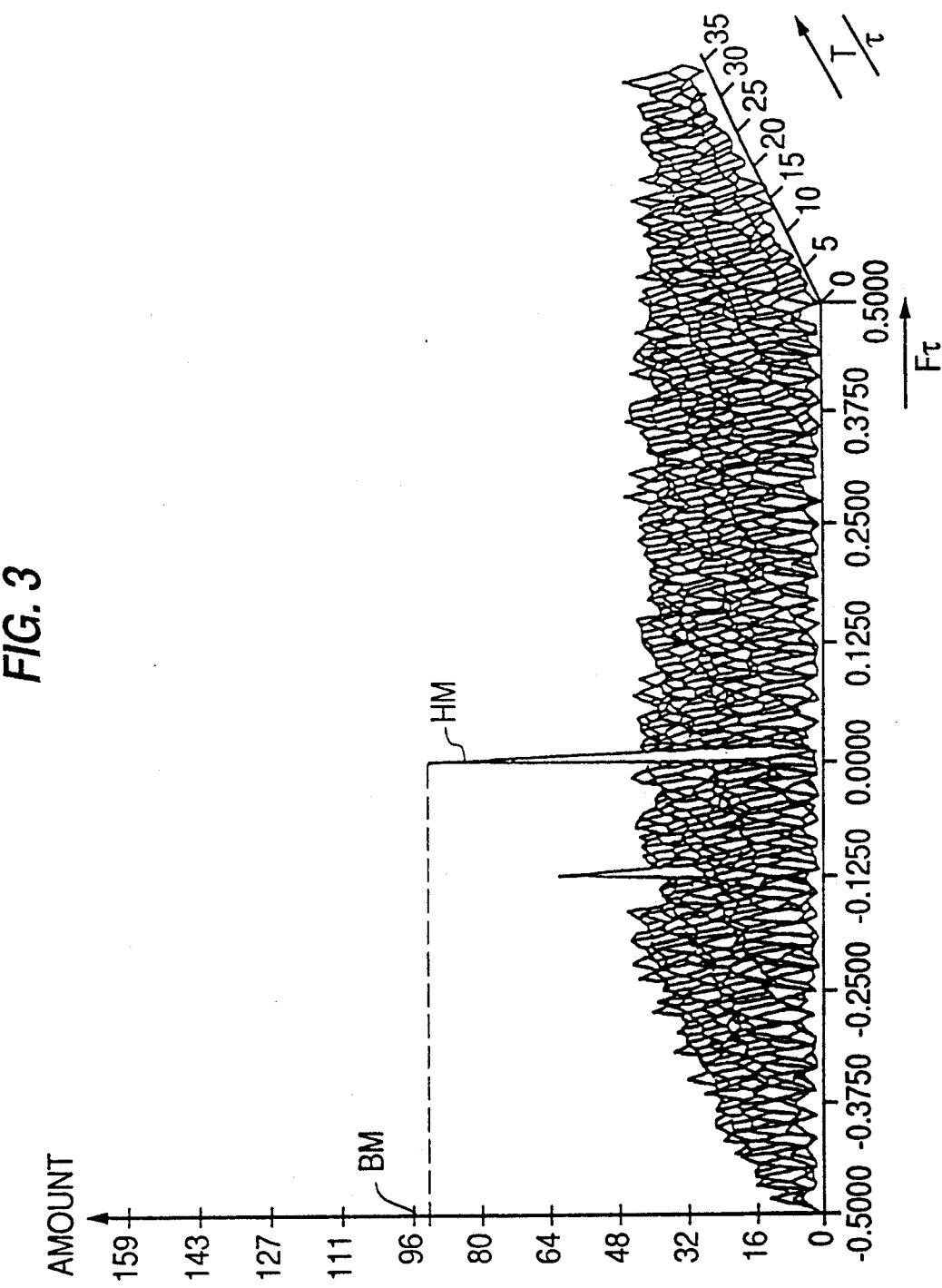

The illustration in FIG. 3 corresponds to that of FIG. 2. Thus, the amplitude (in arbitrary units) of the ambiguity function is again plotted as a function of the standardized Doppler frequency $F \cdot \tau$ and the standardized distance (range) $T/\tau$. FIG. 3 shows the ambiguity function for a multi-target situation in which different Doppler frequencies, distances and amplitudes are associated with the targets. FIG. 3 actually shows six targets. However, only two of them are easily discernible. The evaluation of such a display is advantageously effected according to the following basic principle:

Initially the amplitude maximum BM (FIG. 3) is located over the entire range/Doppler frequency plane. Under the assumption that this maximum is the primary maximum HM of a target, namely that of the target with the strongest level in the plane, it is entered into an output field to be displayed later. Since now the position and the complex vector of a detected primary maximum are available, it is easy to determine the complex vectors of all associated secondary maxima in the range/Doppler frequency plane since the ambiguity function of the code is known. The thus determined reference function is subtracted from the actual range/Doppler frequency function, for example according to FIG. 3, so that further weaker primary maxima in the range of the secondary lobes are exposed. In the resulting difference image, the amplitude maximum is again located, etc. The termination criterion for such an iterative method is determined by a lower amplitude threshold during location of the maxima. The determination of such a lower amplitude threshold is a method that is customary in radar technology.

This manner of proceeding is reinforced by an analytical observation. The linear processing of the received signal $a_n$ which provides the complex vector field of the range/Doppler frequency plane, results from the following equation:

$$\Psi(r,d) = \sum_{n=0}^{MN-1} a_n \cdot s^*_{(n-r)mod(N)} \cdot G_n \cdot e^{j2\pi \frac{d \cdot n}{MN}}$$

Such processing furnishes N distance gates and MN Doppler frequency gates, that is, the complex values to be entered into a total of $M \cdot N^2$ cells (radar resolution cells).

The detection method looks for that value in the field which has the largest amplitude and notes its position $(r_{max}, d_{max})$. The amount of the located primary maximum is entered into the cell $(r_{max}, d_{max})$ of an output field to be displayed later. Additionally, a reference field is determined for the maximum.

This reference field contains the associated annoying secondary maxima with their correct amplitudes and phases. The reference field is formed as follows:

$$\xi(r,d) = \Psi(r_{max},d_{max}) \cdot e^{j2\pi \frac{(d-d_{max}) \cdot r_{max}}{MN}} \chi(r - r_{max}, d - d_{max})$$

where $$\chi(x,y) = \sum_{n=0}^{MN-1} s_n \cdot s^*_{(n-x)mod(N)} \cdot G_n \cdot e^{j2\pi \frac{y \cdot n}{MN}}$$

Accordingly, the reference field is composed of the ambiguity function $X(x,y)$ of the code, which is shifted into the correct range/Doppler frequency position determined by the located maximum, is weighted with the located maximum vector and with a distance and Doppler dependent correction factor.

Thereafter, the reference field is subtracted from the range/Doppler field as follows:

$$\Psi^1(r,d) = \Psi(r,d) - \xi(r,d)$$

The amplitude maximum is again located in the difference field $\Psi^1(r,d)$, and so forth.

An entry of a located maximum into the output field is made only if the respective cell is not already occupied by a previous entry. After termination of the method the output field is displayed. FIG. 5 is a flow diagram of the foregoing described signal processing method.

If a window having p cosine members is employed for linear processing, the number of signal periods to be processed must be at least $M = 2p$ for the detection method to operate properly. If a Blackman window is employed, it follows that $M_{min} = 6$.

Figure 4:
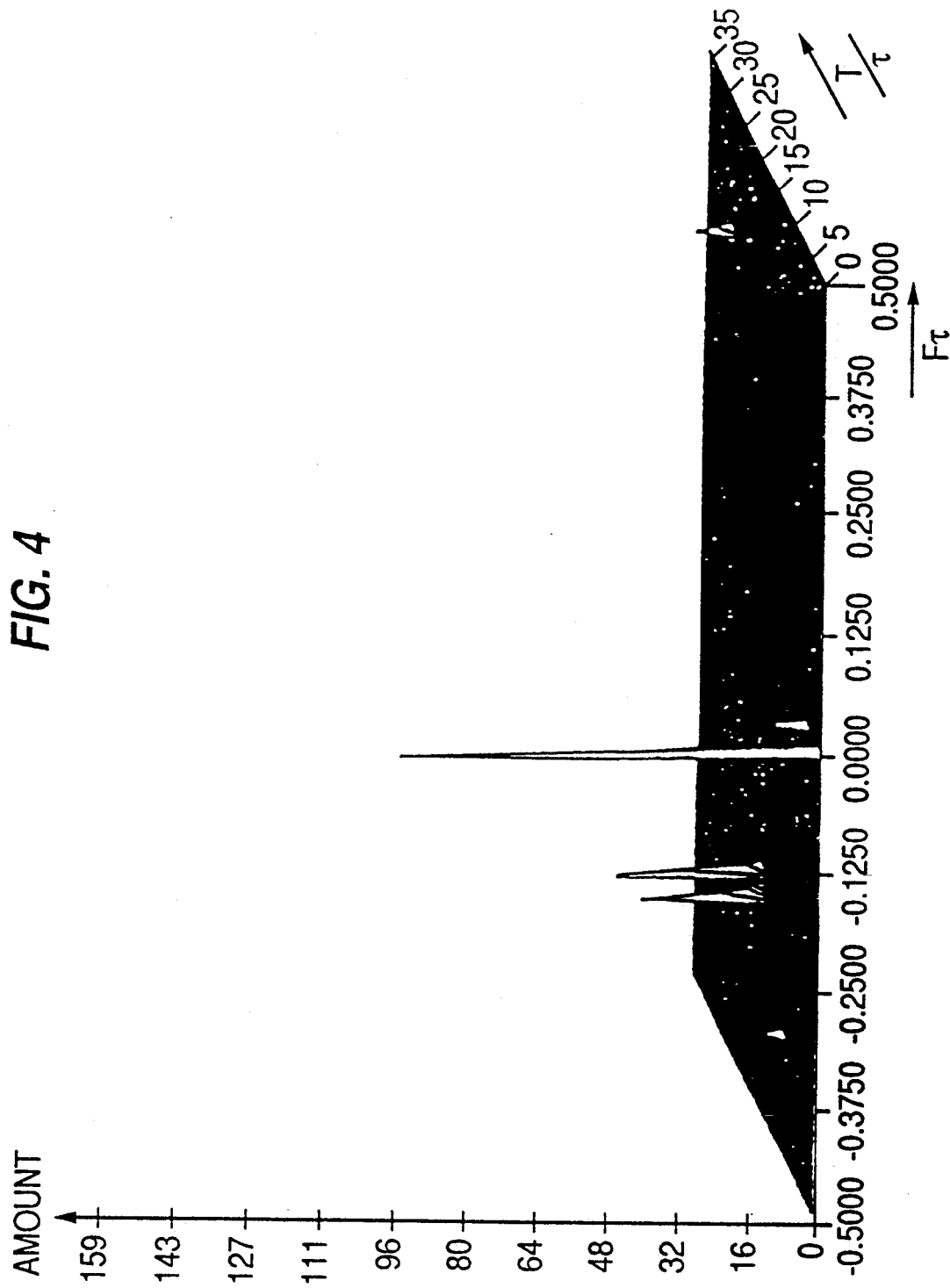

The results determined according to this method are shown in FIG. 4. The mentioned six targets are clearly visible. The plane shown in black represents the mentioned threshold value. The detection dynamic in the example of FIG. 4 is approximately 45 dB. The original secondary lobe spacing of the associated ambiguity function, however, is only 15 dB, since only a code having a code length 37 was employed.

The invention can advantageously be employed for various radar methods, for example, CW radar, HPRF (high pulse repetition frequency) radar or MPRF radar.

Obviously, numerous and additional modifications and variations of the present invention are possible in light of the above teachings. It is therefore to be understood that within the scope of the appended claims, the invention may be practiced otherwise than as specifically claimed.

What is claimed is:

1. A method for processing signals in a radar system in which coded signals are transmitted, then received and thereafter evaluated, comprising:
   providing a signal for transmission;
   coding the signal for transmission with a polyphase code maximum distance unambiguous range ($R_{max}$) and a maximum Doppler frequency unambiguous range ($f_{Dmax}$) of the radar system, with the polyphase code being formed according to the following equation:

$$s_n = \exp\left[j \frac{\pi}{3 \cdot N} (n^3 - N^2 n)\right]$$

where
$s_n$ = original signal n = 0, ..., N = 1
N = number of sub-pulses included in the polyphase code and N ≥ 3; N = prime number;
where the following equations are applicable:

$$R_{max} = N \cdot \tau \cdot c/2$$

and $$f_{Dmax} = 1/\tau$$

where
τ = length of a sub-pulse; and
c = speed of light;
transmitting the polyphase coded signal;
receiving the polyphase coded signal reflected from a target;
employing the received polyphase coded signal to form an ambiguity function (φ) according to the following equation:

$$\phi(r,d) = \left| \sum_{n=0}^{MN-1} a_n \cdot s^*_{(n-r)mod(N)} \cdot G_n \cdot e^{-j2\pi \frac{d \cdot n}{MN}} \right|$$

where
r = 0, ..., N−1; distance gate; standardized to sub-pulse spacing
d = 0, ..., MN−1; Doppler frequency gate; standardized to 1/MN$_\tau$
M = number of periods
N = number of sub-pulses
$s^*_i$ = matched correlator of code $s_i$
$a_i$ = sampled values of the received signal
$G_i$ = window function, M periods long; center symmetrical relative to (MN−1)/2;
determining a maximum number of sub-pulses per period ($N_{max}$) by means of the following equation:

$$N_{max} = \frac{T_B}{M_{min} \cdot \tau}$$

where
$T_B$ = time of observation
τ = spacing of sub-pulses
$M_{min}$ = minimum number of code periods to be processed;
evaluating the ambiguity function (φ) for detecting a primary maximum as representing a target by an iterative detection method including the steps of:
initially determining a first primary maximum amplitude of the ambiguity function over an entire distance/Doppler frequency plane,
associating the first primary maximum of the amplitude with a target and entering the first primary maximum amplitude into at least one of an output field and a display field,
locating the position of the first primary maximum amplitude, its complex vector and the complex vectors of all secondary maxima belonging to the primary maxima amplitude in the distance/Doppler frequency plane,
forming an ambiguity reference function for the first primary maximum amplitude,
subtracting the ambiguity reference function from the ambiguity function to form a difference image,
determining a further primary maximum amplitude in the difference image, and
repeating said interative method using the further primary maximum amplitude as the first primary maximum amplitude to determine another further maximum amplitude to determine another further primary maximum amplitude until the further primary maximum amplitude determined by the foregoing steps drops below a predetermined lower amplitude threshold and then terminating the iterative detection method.

2. The method for processing signals in a radar system according to claim 1 further comprising the steps of:
setting a Blackman window including three cosine members as the window function ($G_i$); and
selecting the minimum number ($M_{min}$) of code periods to be processed using said iterative detection method to be six.

* * * * *